United States Patent [19]

Crawford et al.

[11] 3,853,592

[45] Dec. 10, 1974

[54] HIGHLY STABLE RESIN COATED PAPER PRODUCTS AND METHOD FOR MAKING SAME

[75] Inventors: Irvin H. Crawford, Hamlin; Roger E. Democh; Robert J. Baron, both of Rochester, all of N.Y.

[73] Assignee: Eastman Kodak Company, Rochester, N.Y.

[22] Filed: Apr. 4, 1973

[21] Appl. No.: 347,750

Related U.S. Application Data

[62] Division of Ser. No. 98,055, Dec. 14, 1970, Pat. No. 3,755,069.

[52] U.S. Cl. ........ 117/60, 96/85, 117/76 P;155 UA
[51] Int. Cl. ...................... B32b 27/10, C08f 45/58
[58] Field of Search .............. 117/76 P, 155 UA, 60

[56] References Cited
UNITED STATES PATENTS

| | | | |
|---|---|---|---|
| 2,632,714 | 3/1953 | Loomer | 117/76 P X |
| 2,691,604 | 10/1954 | Priest | 117/60 |
| 2,720,468 | 10/1955 | Shacklett | 117/76 P X |
| 3,345,251 | 10/1967 | Gaertner | 162/158 |
| 3,454,525 | 7/1969 | Tholstrup | 117/155 UA X |
| 3,698,934 | 10/1972 | Eichhorn et al. | 117/76 P |

*Primary Examiner*—Ralph Husack
*Attorney, Agent, or Firm*—E. W. Milan

[57] ABSTRACT

Novel high stability resin coated paper products comprising a core or base of resin stabilizer and/or antioxidant containing paper overcoated with one or more conventional resin layers which are stabilized by migration of the stabilizer or antioxidant from the paper core into the resin layers after application thereof are disclosed. An improved process for making such highly stable resin coated paper products comprising the steps of incorporating the migrating resin stabilizer or antioxidant into the paper core or coating it on the paper core and subsequently overcoating the same with conventional resinous overlayers is also disclosed.

8 Claims, No Drawings

HIGHLY STABLE RESIN COATED PAPER PRODUCTS AND METHOD FOR MAKING SAME

This is a division, of application Ser. No. 98,055 filed Dec. 14, 1970, now U.S. Pat. No. 3,755,069.

FIELD OF THE INVENTION

The present invention relates to resin coated paper products demonstrating improved stability and to methods for producing same, and more particularly to resin coated paper products wherein the resin stabilizer and/or antioxidant is incorporated into the paper core of the product or coated thereon prior to application of the resinous overlayers so that the stabilizing composition migrates into the resinous layers only after coating and curing thereof.

PRIOR ART

The use of resin coated paper, particularly in photographic applictions, to achieve both the economies of paper and the properties of resinous films has been widespread. Perhaps nowhere has more use been made of such materials and more complex technology been evolved in the development of same than in the field of photographic papers which are required to meet very stringent color, i.e., whiteness, wet strength, sensitometric and emulsion impervience standards. The use of resins to coat papers suitable for use in these areas makes the achievement of at least some of these standards, and in particular wet strength and emulsion impervience much easier to achieve due to the superior qualities of resins to meet such qualifications over simple papers.

In the use of such resin coated papers many problems occur, not the least of which relates to the relatively low stability of the resins and, especially polyolefins, used to coat the paper to achieve the desired wet strength etc. Such resins typically deteriorate quite rapidly due to the action of, for example, ultraviolet light or the oxidative action of photographic printing and developing chemicals and/or conditions. It has therefore become of prime importance that such resinous layers be suitably stabilized against such hazards if they are to be useful in photographic papers.

The incorporation of highly efficient stabilizers directly into the resin before coating, however, often generates further problems in the form of reduced or completely negatived bonding of the resin to the overcoated paper, or, as in the case of thermally unstable stabilizers the quality of the resin film is often negatively affected due to degradation of the stabilizer during extrusion.

It is therefore an object of the present invention to provide a superior resin coated paper product which demonstrates improved resin stability and resin to paper bonding and a simplified method for manufacturing same.

Other objects and advantages will be made clear when the details of the following description are considered.

SUMMARY OF THE INVENTION

According to the present invention there is provided a resin coated paper product, suitable for use in photographic applications, comprising a papr core containing a resin stabilizer and/or antioxidant capable of migrating into a resinous overlayer coated onto the paper core. There is further provided a method for manufacturing such a product, which method comprises incorporating a suitable resin stabilizer and/or antioxidant into the paper of a paper core, or, alternatively, coating the antioxidant onto the paper core, subsequently overcoating same with a layer of a suitable resinous material, and finally subjecting the stabilizer treated and resin coated paper core to conditions which result in migration of the stabilizer into the resin layer.

DETAILED DESCRIPTION OF THE INVENTION

In the prior art, and particularly in U.S. Pat. No. 2,691,604 to W. J. Priest issued Oct. 12, 1954, techniques for incorporating acidic hardening agent catalysts which adversely affected the coating properties of polyvinyl alcohol into resinous overcoats thereof after formation of same were developed. According to these techniques, a thin layer of the acidic catalyst was coated on the porous surface of the paper prior to application of the polyvinyl alcohol and hardening agent. On application of the latter coating some of the catalyst in the substratum diffused into the coating while it was still fluid thereby actuating the process of hardening and insolubilization.

It has now been surprisingly discovered that somewhat similar techniques and certain radically different techniques can be used to achieve a similar "late" incorporation of antioxidants or stabilizers, which bear no analogy to the acidic catalysts mentioned above, into polyolefin overcoats applied to paper cores to provide improved wet strength etc.

Accordig to one embodiment of the present invention, a suitable antioxidant or stabilizer, or a mixture of same, is coated onto the surface of a paper stock, dried and subsequently overcoated with a layer of the polyolefin. In this configuration the stabilizer migrates into the polyolefin layer from the substratum of stabilizer when the coated paper product is subjected to conditions of normal use. In the preferred embodiment of the present invention, the antioxidant, stabilizer or mixture of same is incorporated directly into the paper stock, during the paper making process, according to methods detailed below, and the paper thus formed coated with the polyolefin resin. In this configuration the stabilizer migrates from the paper core or base into the polyolefin layer to provide a coated photographic paper which exhibits superior stability while still maintaining its desired wet-strength, resin-to-paper bonding and other valuable characteristics.

The processes described herein are particularly applicable to the coating of paper base with polyolefin resins, however, they are similarly applicable to the manufacture of other products having relatively porous bases and requiring overcoats of stable resinous materials for example polycarbonate, polyester and polyvinyl resins.

Papers suitable for use in accordance with the processes of the present invention to provide the improved products thereof include almost any conventioal paper product susceptible to resin coating according to well known techniques. Particularly preferred in photographic applications are the baryta-coated photographic stocks familiar to those skilled in this art. Studdy indicates that almost any porous substrate when properly matched to a compatible stabilizer, as defined hereinafter, can be used to support a layer of the stabilizer or carry the stabilizer within its bulk. The only criterion being that the stabilizer be compatible with the substrate or carrier and capable of migrating into the resinous overcoating under conditions of normal use.

The list of resinous materials susceptible to stabilization in the fashion described herein is all but coextensive with the list of resinous materials which can be used to overcoat paper or other substrates and which possess a tendency to degrade or deteriorate and therefore require the incorporation of stabilizers to prevent such breakdown.

Specifically preferred for use in the improved photographic papers of the present invention, however, are the poly($\alpha$-olefins), for example polyethylene and polypropylene and mixtures thereof which offer the numerous advantages well known to those skilled in the photographic paper art.

Resinous materials of this type conventionally used in photographic applications will generally include other compositions such as whitening agents ($TiO_2$), antistatic agents and other materials which serve to improve one or another of the required properties of the resinous overlayer.

The particular migrating stabilizer or antioxidant which is coated on the porous substrate or, according to the preferred embodiment of the present invention, incorporated into the bulk of the paper substrate during the paper-making process, will, of course, be determined by the resinous overcoating which it is sought to stabilize, the nature of the degradation which the resin undergoes, and the character of the paper substrate, it being necessary that the stabilizer be compatible with the paper and capable of migrating from the substrate into the resinous overcoat under normal conditions and at a rate which insures both the initial and continued stability of the resin layer. When all of the foregoing conditions are met, a useful product will result.

Resin stabilizers can be broken down into the following five main chemical groups based upon the mechanism of their activity: (1) chain terminators, (2) chain terminator regenerators, (3) peroxide decomposers, (4) metal deactivators and (5) light absorbers (UV and energy transfer agents).

Specific classes of chemicals that fall into each of these categories are as follows: (1) phenols, bis phenols, thio bis phenols and amines, (2) certain sulfur containing compounds, (3) polymeric phosphorous compounds, sulfur and phosphorus compounds, (4) sulfur compounds, polymeric phosphorus compounds and chelating agents and (5) benzophenones, salts of salicylic acid, benzotriazoles and metal organics.

Specific stabilizer compounds within each of the foregoing chemical classes are as follows: (1) 1,3,5-trimethyl-2,4,6 tris(3,5 di-tertiary butyl-4-hydroxytolyl) benzene, 2,2'-thiobis-(4-methyl-6-tertiary butylphenol), 2,2'-methylenebis (4-methyl-6 tertiary butyl phenol), 4,4'-thio bis-(6-tertiary butyl meta cresol), octadecyl (3,5 ditertiary butyl-4-hydroxy phenyl) acetate, 3,5-ditertiary butyl-4-hydroxy phenyl orthophosphate, (2)mercaptans, sulfides, disulfides, (3) 2-Naphthyldisulfide, n-dodecyl sulfide, 2-Naphthelenethiol, tri(2-Ethylhexyl) phosphite, tetrakis (nonylphenyl) polypropyleneglycol disphosphite, (4) 2-benzoimidazolethiol and its derivatives, distearyl pentaerythritol disphosphite, tri cetyl tri thio phosphite, (5)[2,2'-thiobis(4-tertiary-octyl phenolato)]-n-butylamine Nickel (11) zinc (II) dibutyl dithiocarbonate, 2-hydroxy-4-n-octoxybenzophenone.

Specifically preferred as the stabilizer in the poly($\alpha$-olefin) coated papers of the present invention are those contained in groups 1, 3, 4 and 5 listed above. Of particular use as stabilizers for the polyolefin resins described herein are the following specific compounds and mixtures thereof, which as demonstrated by the Examples below, have exhibited highly desirable results: octadecyl (3,5 di-t-butyl-4-hydroxy phenyl) acetate, (3,5 di-t-butyl-4-hydroxy phenyl) ortho phosphate, 4,4'-thiobis (6-5-butyl meta cresol), 2-benzoimidazolethiol, 2-naphthyldisulfide, n-dodecyl sulfide, 2-naphthalenethiol, tri cetyl tri thio phosphite, and zinc (II) dibutyl dithiocarbamate. As further indicated by the examples below, mixtures of some of these compounds demonstrate synergistic effects when incorporated into the paper by addition to the stock furnish.

Generally any stabilizer which can be satisfactorily dispersed in a paper furnish or dispersed in a suitable medium, for example, water to provide a paper substrate overcoat medium, can be used in the successful practice of this invention. It must be remembered, of course, that any such stabilizer must be able to properly migrate into the resin overcoat and meet other standard qualifications relating to resin tint, and odor and, in photographic applications, sensitometry etc., which are well known to those skilled in this art.

When the stabilizers are added to the stock furnish or a stock overcoat layer, and this material is then resin and emulsion coated, a migration of the stabilizer from the uppermost substrate layer into the resin layer appears to take place. It is doubtful that total migration takes place, but diffusion is sufficient to increase stability to within reasonable limits with stabilizer concentrations as described below.

The concentration of the antioxidant and/or stabilizer in or on the paper will of course vary broadly depending upon the effectiveness of the particular additive being incorporated into or coated onto the base, its ability to migrate into the overcoated resinous material, the ambient conditions to which the support will be subjected, etc. However, certain very general concentration and density ranges can be established which will provide effective products at least with the preferred antioxidant and/or stabilizer compositions. Thus, additive concentrations of from about 0.1 to about 10 percent by weight of the paper stock and preferably from about 0.5 to about 2 percent by weight provide useful supports when the additive is incorporated directly into the paper stock either in the paper machine or subsequently before final formation of the paper-sheet. If the stabllizer and/or antioxidant is coaated onto the surface of the furnished paper sheet and subsequently overcoated with the resin an additive density of from about 0.1 to about 2.0 gm/m2 will generally provide improved results of the type sought to be achieved while additive layer densities of from about 0.2 to about 1.0 gm/m2 will provide optimum results with the preferred additives described herein.

Similarly any resin whose stability can be improved by the addition of stabilizers could be benefited by the stabilizer addition method.

As already mentioned above, incorporation of the stabilizer into the substrate may be accomplished along at least two definite routes, i.e., the stabilizer may generally be coated upon the surface of the paper or other core, or alternatively it may be incorporated into the paper stock furnish by addition to the paper in the paper making operation.

Furthermore, various water insoluble solid stabilizers, antioxidants, etc. can be dispersed in a surface sizing solution used in the size tub or size press on a paper machine. These surface sizing operations are commonly carried out in the tub size section of the paper machine. The paper is saturated with sizing solution, passed through press rolls and then dried.

Whichever technique is utilized it is generally necessary to suspend, disperse or dissolve the normally dry stabilizer and/or antioxidant in a suitable liquid medium in order to properly incorporate it into the substratums. In those cases where it is desired to coat the stabilizer onto the paper core prior to application of the resin overcoat such application can be accomplished by dispersing the stabilizer in a suitable, and preferably volatile liquid, coating the dispersion on the paper base and evaporating the dispersant. As should be obvious, the dispersing medium should be compatible with all other portions of the systems if it is to be useful. Such a medium is described in Examples 1 and 2 below wherein toluene is used as the dispersing agent for octadecyl (3,5-di-t-butyl-4-hydroxy phenyl) acetate, (3,5 di-t-butyl-4-hydroxy phenyl) ortho phosphate and (4,4'-thiobis (6-t-butyl meta cresol)). Application of such dispersions can be by any standard roll coating or spraying technique or for example, using a tub or calender sizing method.

As already alluded to, however, according to the preferred embodiment of the present invention, suitable stabilizers, antioxidants, etc. are incorporated directly into the paper stock in the paper making machine. A variety of such materials which are conventionally water insoluble can be predispersed in a conventional size, a number of which are well known to those skilled in this art, and the same then added to the pulp slurry.

An example of such a system and one which forms a preferred embodiment of the invention comprises predispersing the antioxidant, stabilizer, etc., in sodium stearate and adding the dispersion to the pulp slurry in the mixing chest. The sodium stearate in a molar ratio of sodium hydroxide to stearic acid of from about 1:1 to about 3:1 and at approximately from about 1 to about 5 percent solids by weight in water solution is commonly referred to in the paper making art as stearate size. Stearate size is commonly added to the pulp slurry at up to from about 1 to about 5 percent solids by weight of pulp, and precipitated by aluminum chloride just before paper formation to give photographic paper base water resistance and add to its ability to hold out subsequently overcoated emulsions. Such coated papers, containing the aforementioned antioxidants and/or stabilizers, as described in the Examples below, perform satisfactorily as photographic papers and their resinous overcoatings demonstrate the desired degree of stability.

Quite obviously, the particular dispersing medium used to provide the antioxidant-stabilizer dispersion may also vary across a broad range of materials depending upon the additive used, the stock being treated etc., however, the appropriate dispersing medium will, depending on the overall system, be readily apparent to those skilled in this art and such selection forms no critical point of the instant invention.

The following examples will serve to better demonstrate the methods and define the products of the present invention.

EXAMPLE 1

Grade 504 paper stock is coated with a 2 percent by weight solution in toluene of these resin antioxidants, used individually:
1. Irganox 1076 (octadecyl (3,5 di-tertiary butyl-4-hydroxy phenyl) acetate) — made by Geigy Chemical Company.
2. Ethyl 796 (tris (3,5 di-tertiary butyl-4-hydroxy phenyl) phosphate) — made by the Ethyl Corporation.

The dry antioxidant coverage was 0.5 gm/sq meter. Comparisons are prepared by coating with solvent alone, and uncoated paper is included. All samples are then extrusion coated with a medium density polyethylene (0.935, melt index of 8.0[ASTM D1238, condition E]) containing 10 percent titanium dioxide, 0.85 percent colorants and 0.1 percent stearyl stearamide. Total polyethylene coverage is 7.5 lb/1,000 sq. ft. The samples are aged in ovens, with and without visible light illumination. Samples with the antioxidant coating treated in fashion described below show a marked improvement in stability and resistance to yellowing over the comparisons. To test the stability of samples, they are incubated at 105°C for 72 hours and percent reflectance measured at 430 nonometers. Samples containing the antioxidant incorporated as just described demonstrate a 5 percent loss in reflectance while non-antioxidant coated samples demonstrate a 10 percent loss.

In another test similar samples are exposed to a fluorescent light source at an ambient temperature of 90°C until a loss of strength occurs. The antioxidant treated resin coated papers require 184 hours to fail, while the untreated papers fail at 112 hours, a stability improvement of 64 percent.

EXAMPLE 2

The procedure of Example 1 is repeated, but Santonox R (4,4'-thiobis (6-tertiary butyl meta cresol)) made by the Monsanto Chemical Company is used as the antioxidant.

As before, the samples coated with the Santonox R show a marked improvement in stability relative to the comparisons.

Samples exposed to a fluorescent light source at an ambient temperature of 90°C fail in a strength test after 11 days while non-antioxidant coated samples fail after 10 days.

EXAMPLE 3

The procedure of Example 1 is repeated except that 2-Naphthyldisulfide, n-dodecylsulfide, 2-Naphthelenethiol, and tri cetyl tri thio phosphite, polyethylene stabilizers which when incorporated directly into a polyethylene overcoat, adversely affect the coating properties of the resin, are incorporated into the paper stock at a level of 2 percent by weight of furnish. This addition gives a pronounced improvement in the stability of the resin overcoat while producing no detectable adverse effect on any of the desirable properties of the resin.

EXAMPLE 4

Handsheets are made by dispersing a four stabilizer mixture of:
- 40% Butyl Zimate*
- 15% Ethyl 330**
- 30% CAO-6***
- 15% Benzimidazolethiol in stearate size with a Waring Blender. The dispersion is added to the pulp and precipitated with aluminum chloride. Handsheets are made at 38 lbs/1,000 sq ft with stabilizer added at 0.25, 0.5, 1, 2, and 4 percent levels based on the pulp weight. The sheets are extruded with 7.5 lbs/1,000 ft² of a medium density, titanium dioxide pigmented polyethylene on the face side and 8.0 lbs/1,000 ft² of resin, a clear high density polyethylene (0.950 melt index of 7.5), on the back side. Results of testing as described above show a marked improvement in resin stability.

*Zinc (II) dibutyl thiocarbamate
**1,3,5-trimethyl-2,4,6 tris(3,5 di-tertiary butyl-4-hydroxytolyl)-benzene
***2,2'-thio bis-[4-methyl-6-t-butyl phenol]

EXAMPLE 5

A polyolefin stabilizer, 2-naphthyldisulfide, is added to stearate size in the paper mill and dispersed by mixing with a Lightning mixer and passing the dispersion through a centrifugal pump. This dispersion is added to an experimental 12 inch paper machine mixing chest containing refined pulp in a slurry under agitation. The resulting mixture contains 1.5 percent stearate size and 0.5 percent 2-naphthyldisulfide based on the pulp weight. The remaining paper chemistry was added including aluminum chloride precipitation and paper is made at 38 lbs/1,000 ft². A comparison is made with no stabilizer and there is no difference in physical properties or polyethylene adhesion.

The stock is tub sized, calendered and extruded with 7.5 lbs/1,000 ft² of pigmented, medium density titanium dioxide (0.935) polyethylene resin on the face side and 8.0 lbs/1,000 ft² of resin, a clear high density polyethylene, on the back side. The paper performed in an entirely satisfactory manner and resin stability was improved.

EXAMPLE 6

A surface sizing solution is prepared by cooking Claro 5583 starch made by Corn Products Co. at 3.5 percent solids by weight and adding 8 percent $Na_2SO_4$. 2-naphthyldisulfide at 1 percent by weight is dispersed in this solution by dispersing it in a Waring Blender in the presence of 0.2 percent ammonia salt of polymethacrylic acid as surfactant and 0.2 percent Kelzan, a high molecular weight polysaccharide made by the Kelco Co., as a suspending aid. The resulting surface sizing solution is tub sized using a nontub sized 38 lbs/1,000 ft² paper stock. The paper is then calendered. No difference in physical properties is observed between the 2-naphthyldisulfide sized papers and papers sized without the 2-naphthyldisulfide in the size solution. The papers are extruded with polyethylene with excellent adhesion and are sensitized with a gelatine silver halide emulsion. 2-naphthyldisulfide pickups based on the weight of the paper substrate are 0, 0.21, and 0.28 percent. These papers demonstrate improved stability on the order of that reported in Examples 1 and 2 above.

From the foregoing examples, it should be clear that the paper supports including additives as described hereinabove provide superior products with none of the color, tint, adhesion or coating problems incident to the production of these types of materials encountered in the prior art.

The invention has been described in detail with particular reference to preferred embodiments thereof, but it will be understood that variations and modifications can be effected within the spirit and scope of the invention.

We claim:

1. A high stability resin coated paper product comprising a paper substrate, an organic stabilizer additive layer applied to at least one surface of said substrate, and a polyolefin resin coated over said additive layer, said organic stabilizer additive being capable of migrating into said polyolefin resin to stabilize the latter under ambient conditions of normal use.

2. The resin coated paper product of claim 1 wherein said resin is a poly(α-olefin).

3. The resin coated paper product of claim 2 wherein said resin is polyethylene.

4. The resin coated paper product of claim 2 wherein said organic stabilizer additive is selected from the group of stabilizers consisting of phenols, mercaptans, sulfides, phosphorus compounds, benzophenone, salts of salicylic acid, benzatriazoles and metal organics.

5. The resin coated paper product of claim 4 wherein said organic stabilizer additive is present at a density of from about 0.1 to about 2.0 gm/square meter, and is selected from the group consisting of
   a. 1,3,5-trimethyl-2,4,6-tris(3,5-di-t-butyl-4-hydroxytolyl)benzene,
   b. 2,2'-thiobis(4-methyl-6-t-butylphenol),
   c. 2,2'-methylenebis(4-methyl-6-t-butylphenol),
   d. 4,4'-thiobis(6-t-butyl metacresol),
   e. octadecyl(3,5-di-t-butyl-4-hydroxyphenyl) acetate,
   f. 3,5-di-t-butyl-4-hydroxyphenyl orthophosphate,
   g. 2-naphthyl disulfide,
   h. n-dodecyl sulfide,
   i. 2-naphthalenethiol,
   j. tri(2-ethylhexyl)phosphate,
   k. tetrakis(nonylphenyl)polypropyleneglycol diphosphite,
   l. 2-benzimidazolethiol,
   m. distearyl pentaerythritol diphosphite,
   n. tricetyl trithio phosphite,
   o. [2,2'-thiobis(4-tertiary octylphenolato)]-n-butylamine nickel (II),
   p. zinc (II) dibutyl thiocarbonate, and
   q. 2-hydroxy-4-n-octoxyl-benzophenone.

6. The resin coated paper product of claim 5 wherein said additive layer has a density of from about 0.2 to about 1.0 gm/square meter.

7. The resin coated paper product of claim 4 wherein said phenol organic stabilizer additive is a bis phenol or thiobis phenol.

8. A method for manufacturing a high stability resin coated paper product comprising the steps of:
   a. dispersing an organic stabilizer additive in a suitable medium to form an additive dispersion;
   b. applying said additive dispersion to at least one surface of a paper sheet;
   c. coating said surface from step (b) with a suitable polyolefin resin to form a coated sheet; and
   d. subjecting said coated sheet to conditions which cause a stabilizing amount of said organic stabilizer additive to migrate from said sheet into the resin portion of said coated sheet.

* * * * *